United States Patent [19]

Miyamoto et al.

[11] Patent Number: 5,927,697
[45] Date of Patent: Jul. 27, 1999

[54] LIQUID-ENCAPSULATED ANTI-VIBRATION DEVICE

[75] Inventors: Yasuo Miyamoto; Yasunori Oku, both of Wako, Japan

[73] Assignee: Honda Giken Kogyo Kabushiki Kaisha, Tokyo, Japan

[21] Appl. No.: 08/933,035

[22] Filed: Sep. 18, 1997

[30] Foreign Application Priority Data

Sep. 20, 1996 [JP] Japan .................................. 8-249560

[51] Int. Cl.$^6$ ....................................................... F16F 5/00
[52] U.S. Cl. ....................................................... 267/140.12
[58] Field of Search ......................... 267/140.11, 140.12, 267/140.13, 219; 180/300, 312; 248/562, 636

[56] References Cited

U.S. PATENT DOCUMENTS

| | | | |
|---|---|---|---|
| 4,936,556 | 6/1990 | Makibayashi et al. ............. | 267/140.13 |
| 5,139,240 | 8/1992 | Miyamotot et al. ................ | 267/140.13 |
| 5,195,728 | 3/1993 | Skipper ............................... | 267/140.13 |

*Primary Examiner*—Robert J. Oberleitner
*Assistant Examiner*—Robert A. Siconolfi
*Attorney, Agent, or Firm*—Armstrong, Westerman, Hattori, McLeland, & Naughton

[57] ABSTRACT

A liquid-encapsulated anti-vibration device is provided having an inner shell and an outer shell connected to each other by means of a first elastomeric member, a second elastomeric member and a diaphragm. A main liquid chamber is defined between the first and second elastomeric members and changed in volume by the axial movement of the inner and outer shells relative to each other. A subsidiary liquid chamber is defined between the first elastomeric member and the diaphragm. The main and subsidiary liquid chambers communicate with each other by a constriction extending axially through the first elastomeric member. Since the diaphragm is mounted independently from the first elastomeric member, the size and shape of the constriction, defined in the first elastomeric member, cannot be limited by the diaphragm. Thus, it is ensured that the constriction has a sufficient length to permit communication between the main liquid chamber and the subsidiary liquid chamber in the liquid-encapsulated anti-vibration device to decrease the resonant frequency without decreasing the cross-sectional area of a flow path in the constriction.

2 Claims, 10 Drawing Sheets

5,927,697

LIQUID-ENCAPSULATED ANTI-VIBRATION DEVICE

TECHNICAL FIELD OF THE INVENTION

The present invention relates to a liquid-encapsulated anti-vibration device including a main liquid chamber and a subsidiary liquid chamber defined in elastomeric members and communicating with each other through a constriction.

DESCRIPTION OF THE RELATED ART

FIGS. 8 and 9 show a prior art liquid encapsulated anti-vibration device. This prior art liquid-encapsulated anti-vibration device M includes an inner shell made up of a center pipe 01 and a bushing 02, and an outer shell made up of a first collar 03 and a second collar 04. The inner and outer shells are connected to each other by first and second elastomeric members 05 and 06, each being filled with a liquid. A main liquid chamber 07 is defined between the first and second elastomeric members 05 and 06, so that the volume thereof is increased and decreased by a load. A constriction 08 is defined in the first elastomeric member 05 and connected to an upper portion of the main liquid chamber 07. A subsidiary liquid chamber 09 is connected to an upper portion of the constriction 08 and defined by a diaphragm 010 having a wall surface radially outward thereof which is deformed by a liquid pressure.

FIG. 10 shows the variation in spring characteristic with respect to the frequency inputted into the prior art liquid-encapsulated anti-vibration device M, wherein the y-axis or the axis of ordinates indicates the ratio of the dynamic spring constant $K^*$ to the static spring constant $K_S$ of the liquid-encapsulated anti-vibration device M. The static spring constant $K_S$ is constant regardless of the input frequency, and hence, the y-axis or the axis of ordinates substantially corresponds to the value of the dynamic spring constant $K^*$. As shown by a solid line in FIG. 10, the prior art liquid-encapsulated anti-vibration device M is established, so that a bottom (i.e., a lower region of dynamic spring constant) of the dynamic spring constant corresponds to nearly 450 Hz of the input frequency.

In the prior art liquid-encapsulated anti-vibration device M, the constriction 08 and the subsidiary liquid chamber 09 ARE disposed in series within the common first elastomeric member 05 and for this reason, it is difficult to ensure a sufficient length of the constriction 08. Therefore, if an attempt is made to set the bottom of the dynamic spring constant in the vicinity of 250 Hz, which is a resonant frequency of an air column in a tire, to decrease the road noise, it is necessary to decrease the cross-sectional area of a flow path in the constriction 08 by an amount suitable for a short length of the constriction 08. However, if the cross-sectional area of the flow path in the constriction 08 is decreased, a problem is encountered that the flow path resistance increases. As a result of the increase in flow path resistance, it is difficult to attain resonance of a liquid column in the constriction 08, whereby the dynamic spring constant is not sufficiently decreased (see the dashed line in FIG. 10).

The present invention solves the above-described problem. Thus, it is an object of the present invention to provide a liquid-encapsulated anti-vibration device which is ensured of having a constriction of sufficient length to permit communication between the main liquid chamber and the subsidiary liquid chamber in order to easily decrease the resonant frequency.

SUMMARY OF THE INVENTION

According to a feature of the present invention, to achieve the mentioned object, a liquid-encapsulated anti-vibration device is proposed which includes: an inner shell; an outer shell disposed outside said inner shell; a first elastomeric member connecting the inner shell to the outer shell; a second elastomeric member axially connecting the inner shell to the outer shell at a first end of the first elastomeric member and having a diameter larger than a diameter of the first elastomeric member; a diaphragm axially connecting the inner shell to the outer shell at a second opposed end of the first elastomeric member; a main liquid chamber defined between the first elastomeric member and the second elastomeric member, so that a volume of the main liquid chamber is increased and decreased by movement in an axial direction of the inner shell and the outer shell relative to each other; a subsidiary liquid chamber defined between the first elastomeric member and the diaphragm; and a first constriction axially defined over an entire length of the first elastomeric member to permit communication between the main liquid chamber and the subsidiary liquid chamber.

With this arrangement, if the inner and outer shells are axially moved relative to each other by the inputting of a load, the volume of the main liquid chamber is any one of increased and decreased by the deformation of the second elastomeric member, and the volume of the subsidiary liquid chamber, communicating with the main liquid chamber through the constriction, is any one of increased and decreased by any one of the expansion and contraction of the diaphragm, respectively. In a region where the input frequency of the load substantially corresponds to the resonant frequency of the liquid column within the constriction, the dynamic spring constant of the liquid-encapsulated anti-vibration device is decreased. Since the diaphragm connecting the inner and outer shells to each other is mounted independently from the first elastomeric member connecting the inner and outer shells to each other, the size of the constriction defined in the first elastomeric member cannot be limited by the diaphragm, and the entire length of the constriction can be made relatively long, at least as compared with the length of the constriction in the prior art liquid-encapsulated anti-vibration device. Thus, it is possible to decrease the resonant frequency of the liquid column in the constriction without decreasing the cross-sectional area of the flow path in the constriction, and to effectively decrease the dynamic spring constant, for example, in a road noise frequency region.

Also according to another feature of the present invention, the characteristic of variation in dynamic spring constant with respect to the input frequency can be established as desired by the fact that the resonant characteristics of liquid columns in first and second constrictions are different.

BRIEF DESCRIPTION OF THE DRAWING FIGURES

DETAILED DESCRIPTION OF THE PREFERRED EMBODIMENT

The mode for carrying out the present invention will now be described by way of embodiments shown in the accompanying drawing figures.

Figure 1:
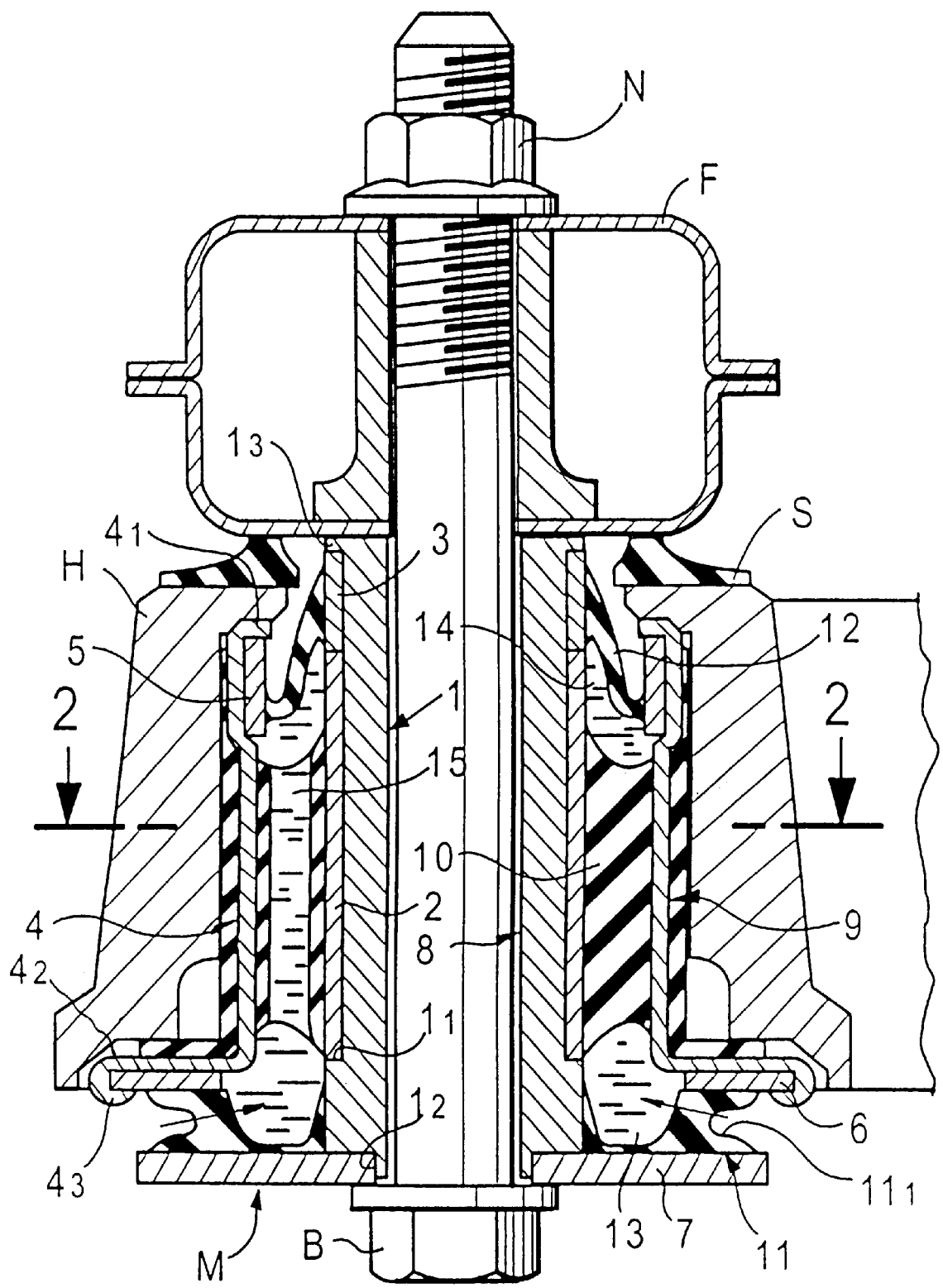
FIG. 1 is a vertical cross-sectional view of a liquid-encapsulated anti-vibration device according to a first embodiment of the present invention taken along a line 1—1 in FIG. 2.
Figure 2:
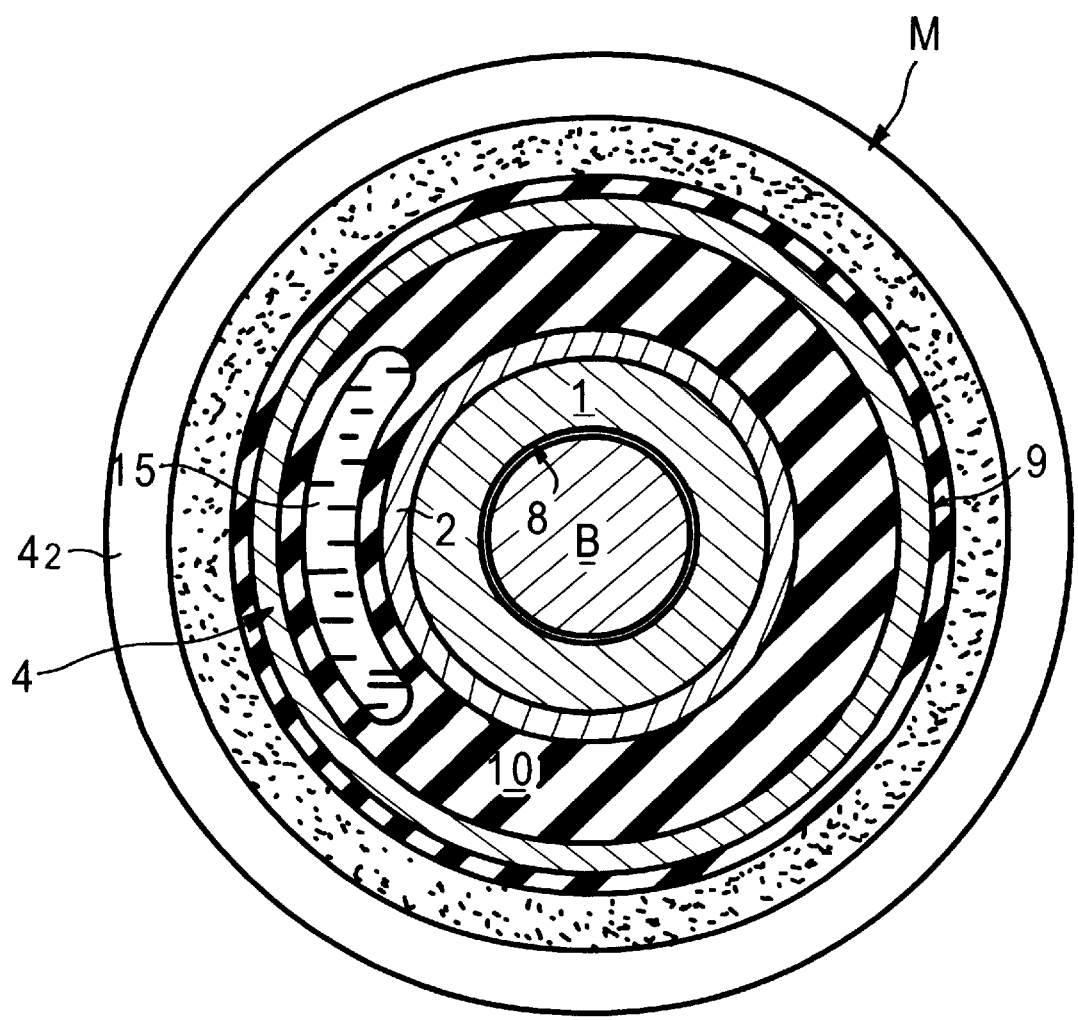
FIG. 2 is a cross-sectional view taken along a line 2—2 in FIG. 1.

FIGS. 1 to 4 illustrate a first embodiment of the present invention. A liquid-encapsulated anti-vibration device M shown in FIGS. 1 and 2 is used for resiliently supporting a front subframe of a vehicle on a vehicle body frame. In a condition in which the liquid-encapsulated anti-vibration device M has been fitted from below into a cap-like holder H mounted on the front subframe and having a lower surface opened, a bolt B is inserted from below into the center of the liquid-encapsulated anti-vibration device M and passed upwards through the vehicle body frame F to fasten the liquid-encapsulated anti-vibration device M by a nut N. In this case, a rubber seal S is disposed between an upper surface of the cap-like holder H and a lower surface of the vehicle body frame F. The transmission of a vibration inputted from a suspension supported on the front subframe or a vibration inputted from an engine mounted on the front subframe to the vehicle body frame F is prevented by resiliently supporting the front sub-frame on the vehicle body frame F using a plurality of (e.g., six) liquid-encapsulated anti-vibration devices M.

The liquid-encapsulated anti-vibration device M includes a cylindrical center pipe 1 into which the bolt B is inserted. The outside diameter of the center pipe 1 is such that the center pipe 1 is stepped. The center pipe 1 is formed with its lower portion below a first step $1_1$ having a larger diameter and its upper portion above the first step $1_1$ having a smaller diameter. A first cylindrical collar 2 and a second cylindrical collar 3 are fitted over the smaller-diameter portion above the first step $1_1$ of the center pipe 1 and fixed by means of caulking at $1_3$ at an upper end of the center pipe 1. A third substantially cylindrical collar 4 is concentrically disposed outside the center pipe 1. A fourth cylindrical collar 5 is fitted to an inner periphery of the third collar 4 at an upper end thereof and fixed by means of caulking at $4_1$, and a ring plate 6 is fixed by means of caulking at $4_3$ to a lower surface of a flange $4_2$ integrally formed at a lower end of the third collar 4. A ring-like bottom plate 7 is fixed by being press-fit to a second step $1_2$ at a lower end of the center pipe 1. The three members, namely, the first center pipe 1, the first collar 2 and the second collar 3, constitute an inner shell 8. The two members, namely, the third and fourth collars 4 and 5, constitute an outer shell 9.

The first collar 2 is radially disposed at an inner side and the third collar 4 is radially disposed at an outer side. The first collar 2 is connected to the third collar 4 by a first substantially cylindrical elastomeric member 10. An outer peripheral surface of the first collar 2 is coupled with an inner peripheral surface of the first elastomeric member 10 by being baked thereon. A second annular elastomeric member 11 is coupled to a lower surface of the ring plate 6 and an upper surface of the bottom plate 7 by being baked thereon, and an annular diaphragm 12 is coupled to an outer peripheral surface of the second collar 3 and an inner peripheral surface of the fourth collar 5 by being baked thereon.

The diameter of the second elastomeric member 11 is larger than the diameter of the first elastomeric member 10, and an annular main liquid chamber 13, filled with a liquid, is defined between the first and second elastomeric members 10 and 11. When the inner and outer shells 8 and 9 are moved axially with respect to each other, the second elastomeric member 11 is deformed to both increase and decrease the volume of the main liquid chamber 13. An annular groove $11_1$ is defined over 360° in an outer peripheral surface of the second elastomeric member 11. An annular subsidiary liquid chamber 14, filled with a liquid, is defined between the first elastomeric member 10 and the diaphragm 12 and communicates with the main liquid chamber 13 through a single constriction 15 axially passed through the inside of the first elastomeric member 10. When the volume of the main liquid chamber 13 is decreased, thereby causing the liquid to be supplied from the main liquid chamber 13 through the constriction 15 to the subsidiary liquid chamber 14, the diaphragm 12 is deformed outwardly to increase the volume of the subsidiary liquid chamber 14. When the volume of the main liquid chamber 13 is increased, thereby causing the liquid to be supplied from the subsidiary liquid chamber 14 through the constriction 15 to the main liquid chamber 13, the diaphragm 12 is deformed inwardly to decrease the volume of the subsidiary liquid chamber 14.

With the liquid-encapsulated anti-vibration device having the above-described construction, when a vibration is inputted from any one of the suspension and the engine to the front subframe, thereby causing the outer shell 9, coupled with the front subframe through the cap-like holder H, and the inner shell 8, coupled with the vehicle body frame F through the bolt B, to be moved axially with respect to each other, the second elastomeric member 11 is any one of expanded and axially contracted to any one of increase and decrease the volume of the main liquid chamber 13. During this time, the compressed second elastomeric member 11 is radially deformed inwardly in the direction of the arrows shown in FIG. 1 because of the annular groove $11_1$ defined around the outer periphery of the second elastomeric member 11 and hence, the volume of the main liquid chamber 13 can be effectively changed.

Figure 3:
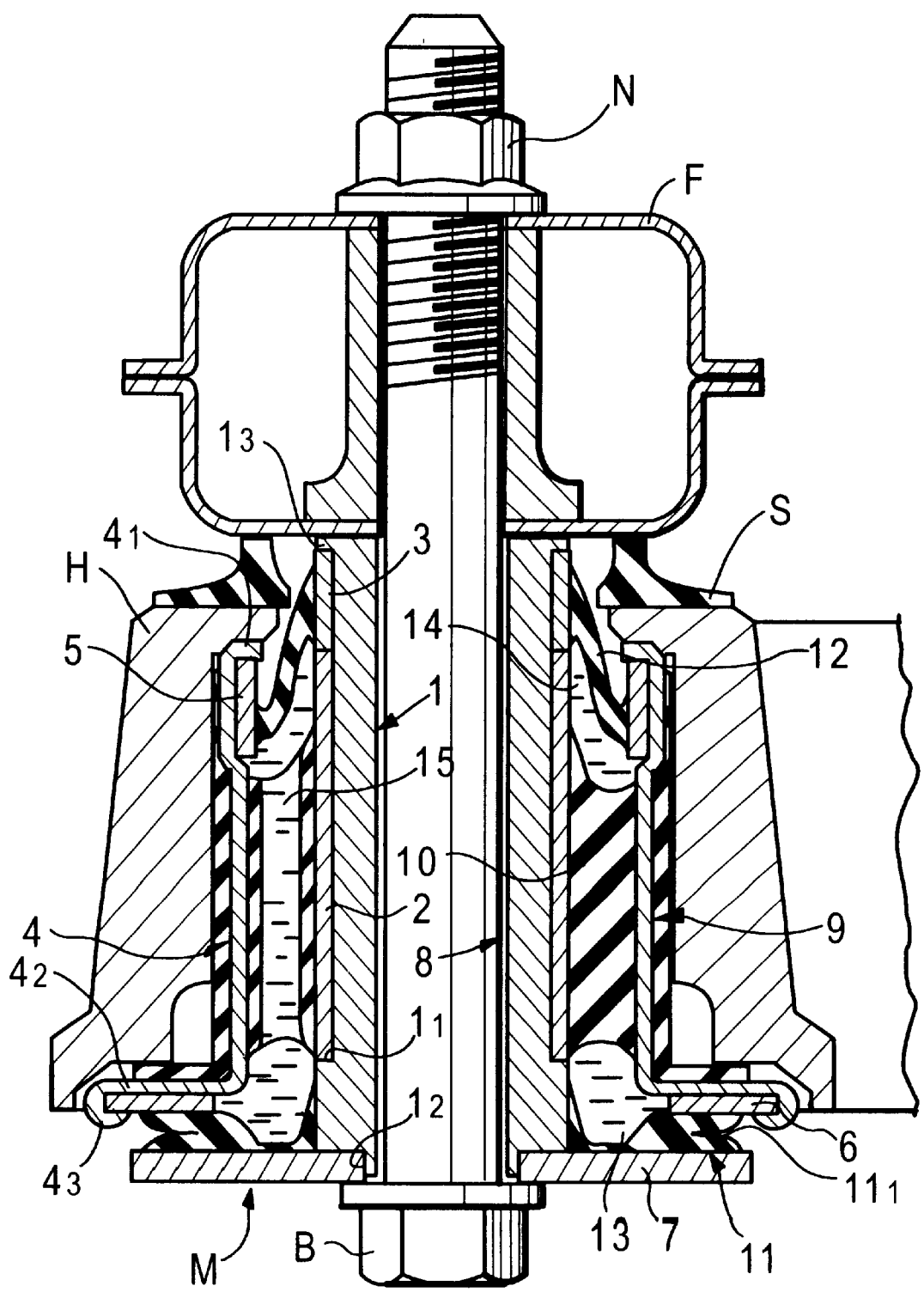
FIG. 3 is a view similar to FIG. 1 for explaining the operation of the device.

When a large load is inputted to strongly compress the second elastomeric member 11, the annular groove $1_1$ is completely broken, as shown in FIG. 3, and hence, the further movement of the inner and outer shells 8 and 9 relative to the each other is limited. Thus, it is possible for the second elastomeric member 11 itself to have a stopper function provided when the large load is inputted, leading to a simplified structure, without provision of a special stopper. Moreover, a load supporting force is gradually increased as the annular groove $11_1$ is broken and hence, it is possible to effectively avoid the generation of a shock.

Figure 4:
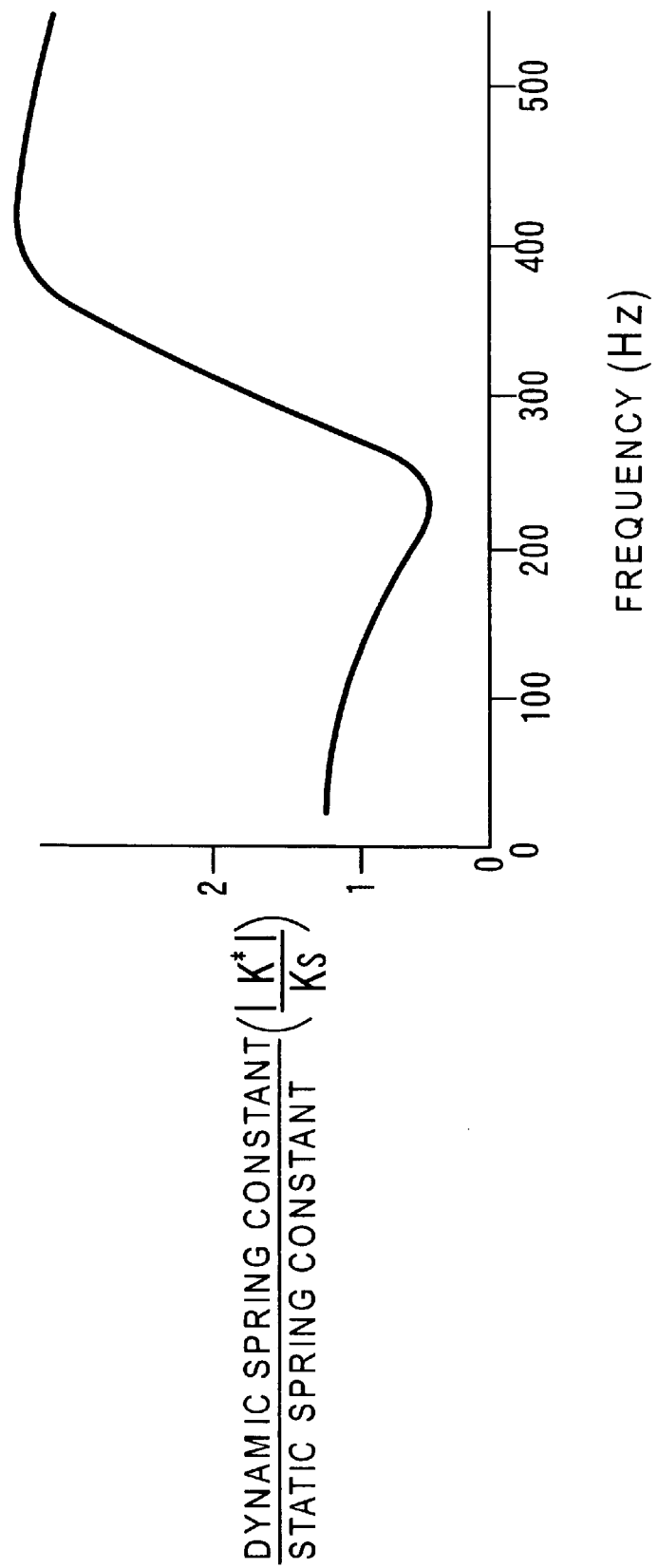
FIG. 4 is a graph illustrating the relationship between the input frequency and the dynamic spring constant in the first embodiment.
Figure 10:
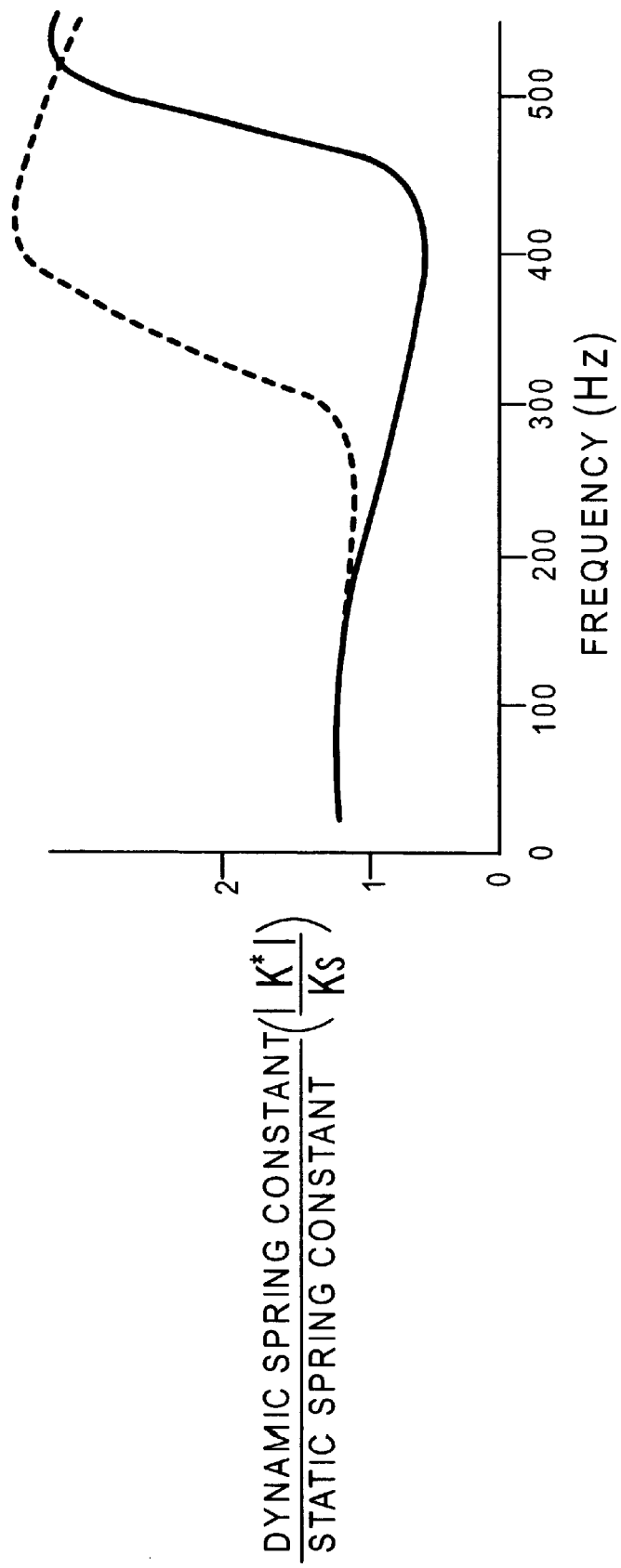
FIG. 10 is a graph illustrating the relationship between the input frequency and the dynamic spring constant in the prior art.

In addition, since the diaphragm 12 is formed of a material different from that for the first elastomeric member 10, the constriction 15 can be formed of a sufficient length over the entire axial length of the first elastomeric member 10 and therefore, the resonant frequency of a liquid column in the constriction 15 can be reduced without decreasing the cross-sectional area of a flow path in the constriction 15. Moreover, the volume of the subsidiary liquid chamber 14 having the soft diaphragm 12 is easily deformed and hence, the movement of the liquid in the constriction 15 cannot be hindered, whereby the resonance of the liquid column in the constriction 15 can be effectively performed. As a result, the dynamic spring constant K* can be largely decreased in the vicinity of 250 Hz, which is a resonant frequency of an air column in a tire, as shown in FIG. 4, thereby effectively reducing the road noise. As is apparent from the comparison with a prior art example shown by a dashed line in FIG. 10, it can be seen that according to the embodiment of the present invention, the bottom of the dynamic spring constant K* in the vicinity of 250 Hz is lowered.

Figure 5:
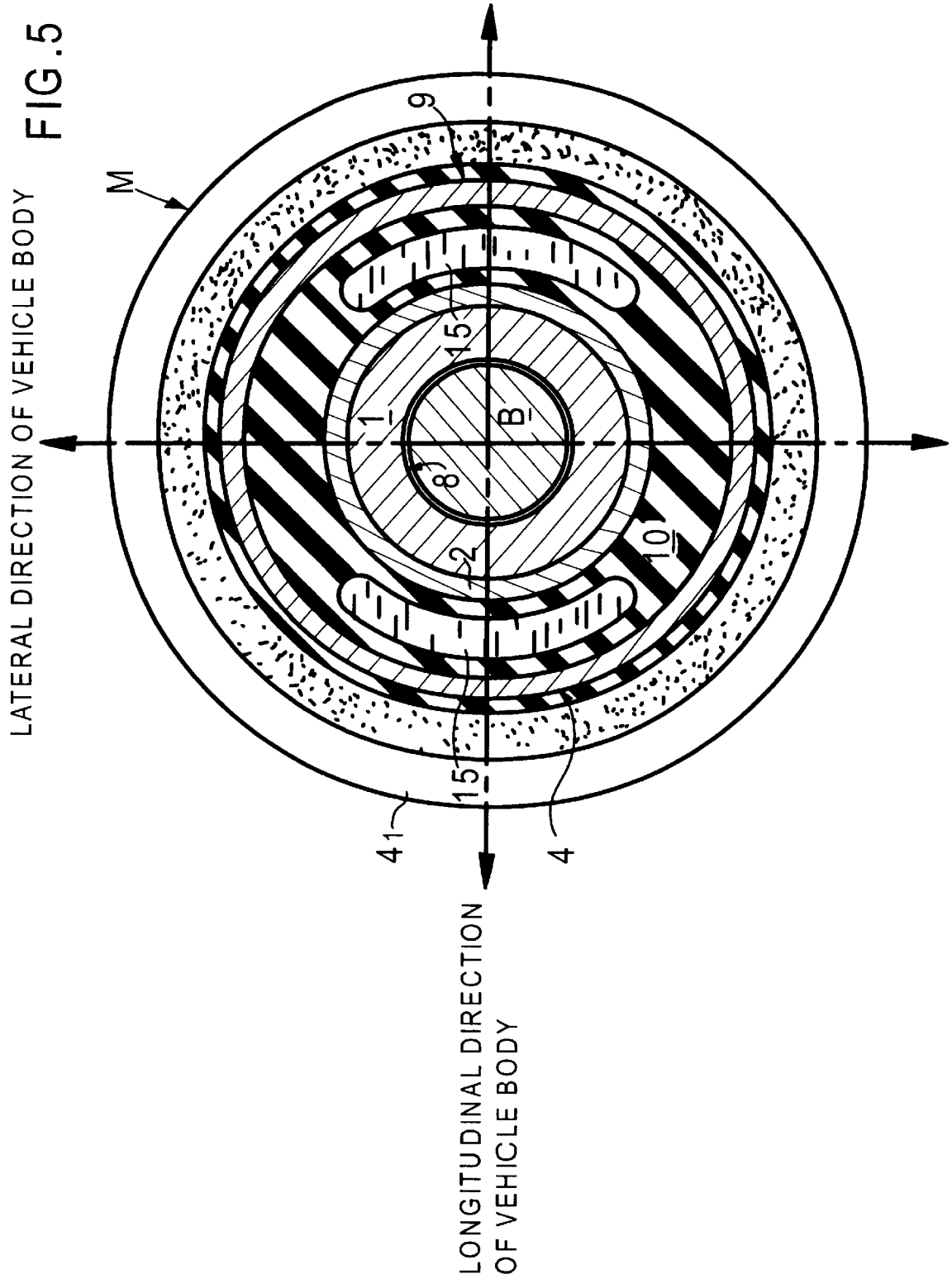
FIG. 5 is a view similar to FIG. 2, but according to a second embodiment of the present invention.

A second embodiment of the present invention will be described below with reference to FIG. 5.

A liquid-encapsulated anti-vibration device M according to the second embodiment includes two constrictions 15 on opposite sides of an axis thereof. A straight line connecting both the constrictions 15 to each other is disposed in a longitudinal direction of a vehicle body. In the second embodiment, when an axial (vertical) load is inputted, a function and effect similar to those in the first embodiment can be provided. In addition to this, when a load in the longitudinal direction of the vehicle body is inputted, the static spring constant $K_S$ can be decreased by the deformation of the two constrictions 15 to enhance the riding comfort. When a load in a lateral direction of the vehicle body is inputted, the static spring constant $K_S$ can be increased by non-deformation of the two constrictions 15, thereby enhancing steering stability.

Figure 6:
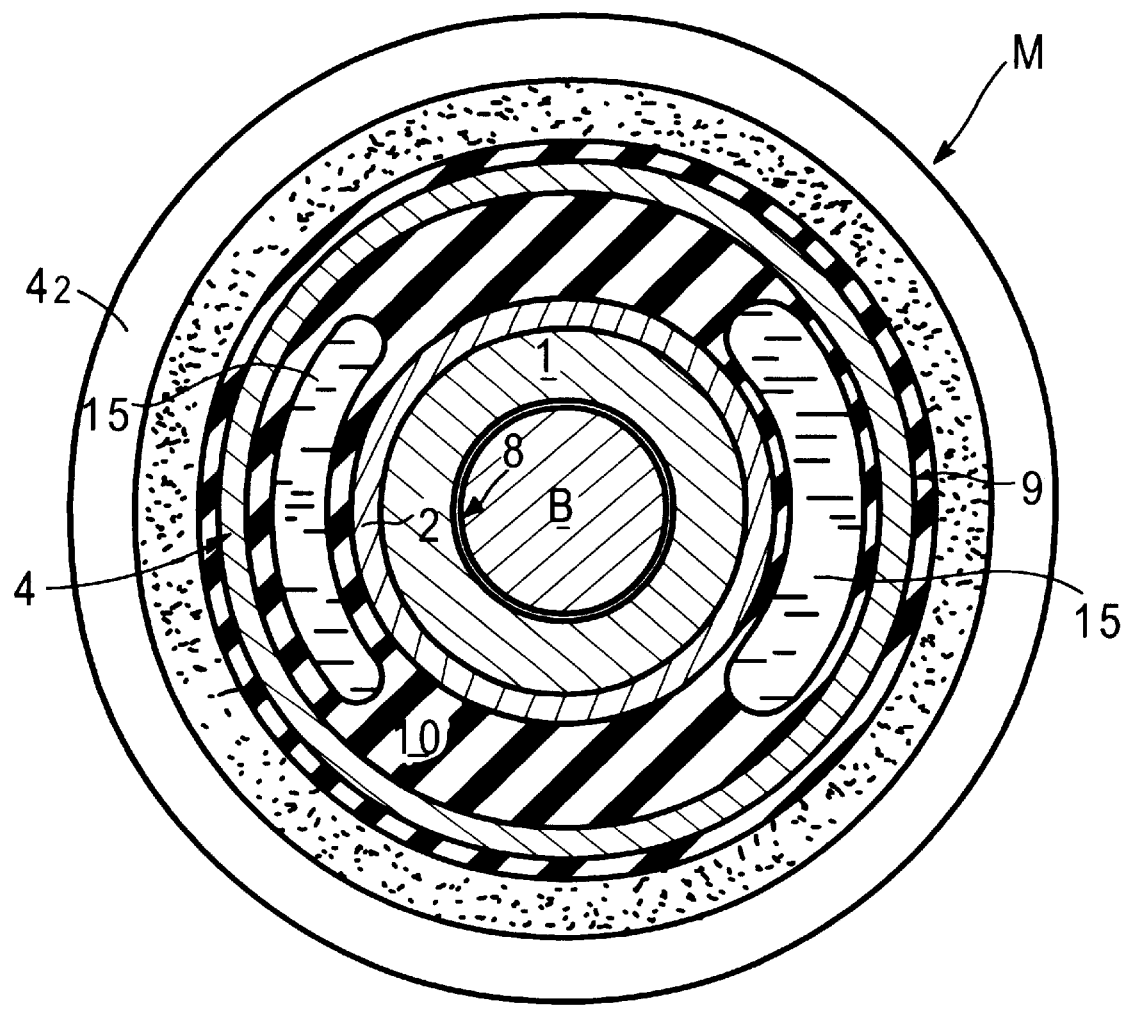
FIG. 6 is a view similar to FIG. 2, but according to a third embodiment of the present invention.
Figure 7:
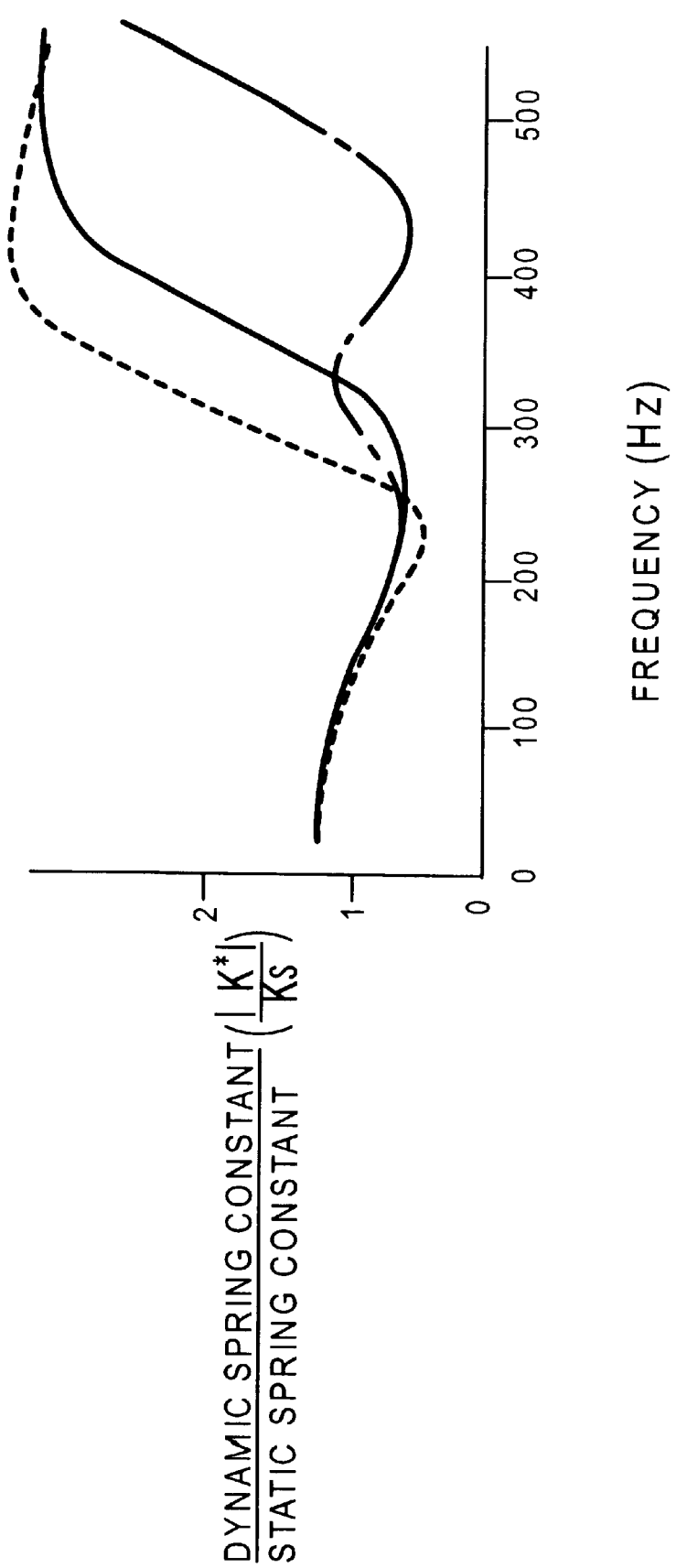
FIG. 7 is a graph illustrating the relationship between the input frequency and the dynamic spring constant in the third embodiment.
Figure 8:
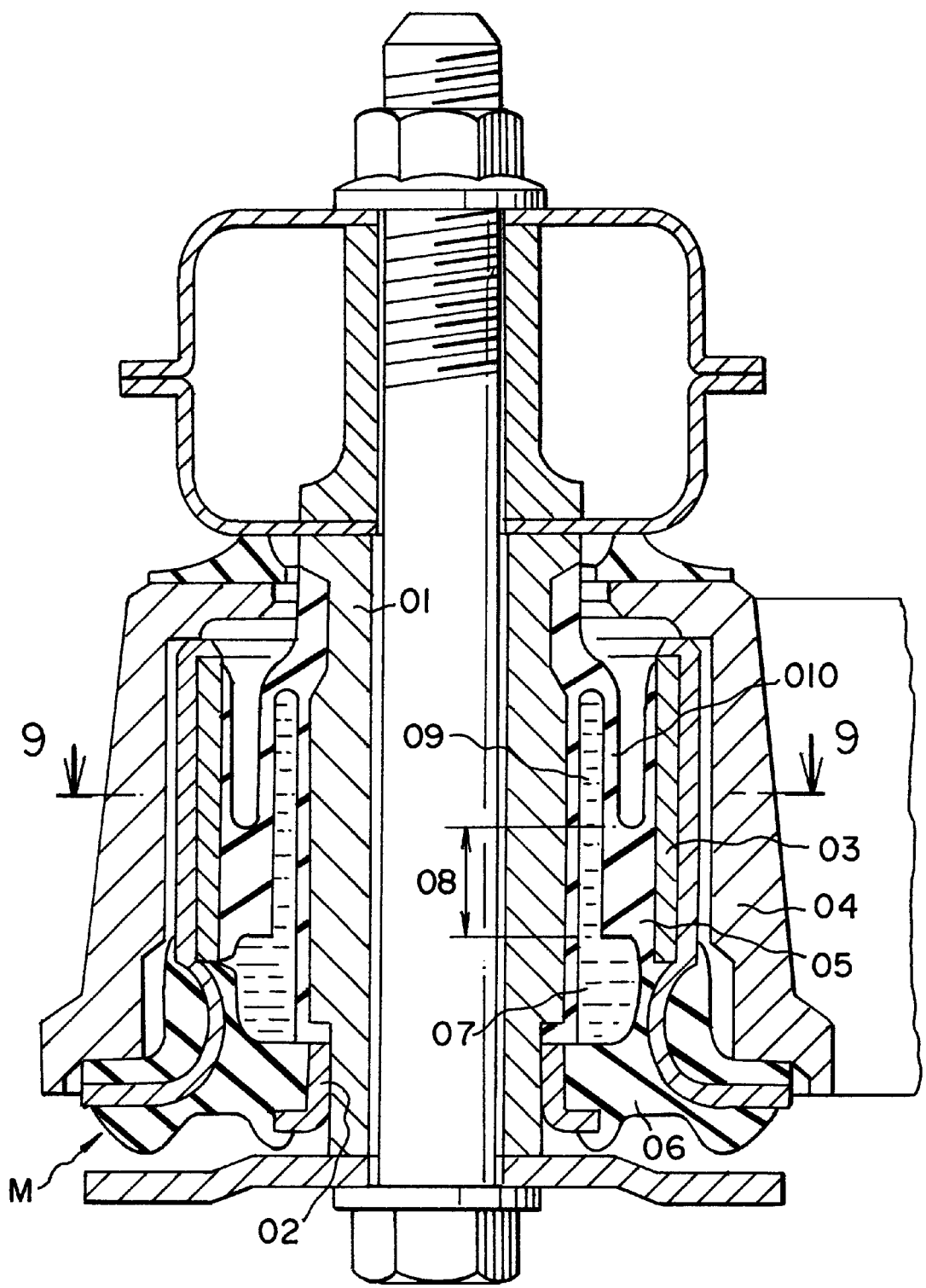
FIG. 8 is a vertical cross-sectional view of a prior art liquid-encapsulated anti-vibration device taken along a line 8—8 in FIG. 9.
Figure 9:
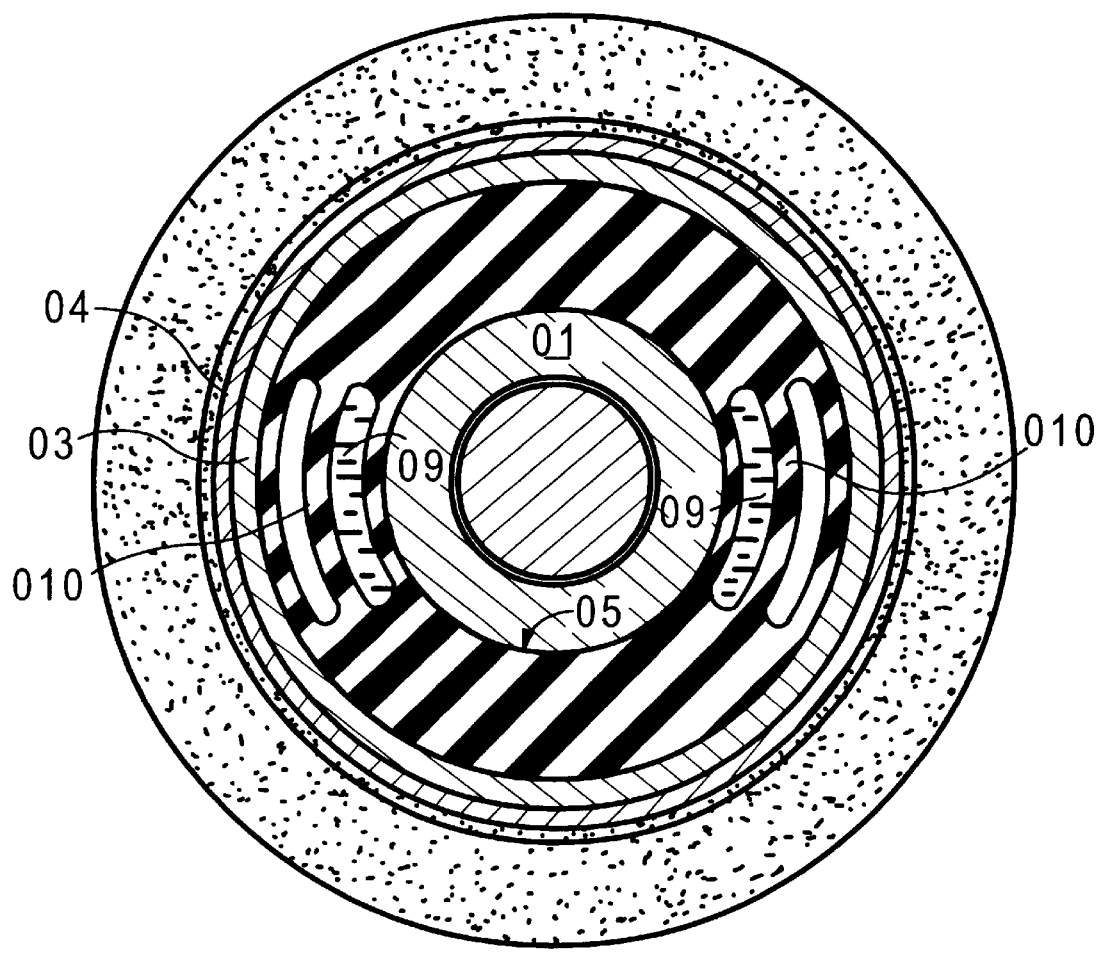
FIG. 9 is a cross-sectional view taken along a line 9—9 in FIG. 8.

A third embodiment of the present invention will be described below with reference to FIGS. 6 and 7.

A liquid-encapsulated anti-vibration device M according to the third embodiment includes two constrictions 15 on opposite sides of an axis thereof, as in the second embodiment, but the cross-sectional areas of flow paths in the two constrictions 15 are different. In this way, the characteristic of a dynamic spring constant K* can be established as desired, for example, as shown in FIG. 7, by regulating the resonant frequencies of liquid columns in the two constrictions 15. In FIG. 7, a dashed line indicates the characteristic in the first embodiment having the single constriction, and a solid line and a one-dot dashed line indicate two examples of the characteristics in the third embodiment. The characteristics shown by the solid line has a wider bottom region of the dynamic spring constant K* in the vicinity of 250 Hz, and the characteristic shown by the one-dot dashed line has two bottom regions in the vicinity of 250 Hz and 450 Hz.

Although the embodiments of the present invention have been described in detail, it will be understood that the present invention is not limited to the above-described embodiments, and various modifications may be made without departing from the spirit and scope of the invention defined in the claims.

For example, the characteristics of the two constrictions 15 may be varied in terms of the cross-sectional areas of the flow paths in the third embodiment. Also, the length of the flow paths may be varied, and the material for the elastomeric members for deforming the constrictions 15 may be changed.

As discussed above, according to an embodiment of the present invention, the diaphragm connecting the inner and outer shells to each other is mounted independently from the first elastomeric member connecting the inner and outer shells to each other. Therefore, the size of the constriction defined over the entire axial length of the first elastomeric member cannot be limited by the diaphragm. As a result, the entire length of the constriction can be made relatively long, at least as compared with the length of the constriction in the prior art liquid-encapsulated anti-vibration device. Thus, it is possible to decrease the resonant frequency of the liquid column in the constriction without decreasing the cross-sectional area of the flow path in the constriction and hence, to effectively decrease the dynamic spring constant, for example, in the road noise frequency region.

Also, according to another embodiment of the present invention, the characteristic of variation in dynamic spring constant with respect to the input frequency can be established as desired by the fact that the liquid-encapsulated anti-vibration device includes first and second constrictions having different resonant characteristics of liquid columns.

We claim:

1. A liquid-encapsulated anti-vibration device comprising:

an inner shell;

an outer shell disposed outside said inner shell;

a first elastomeric member connecting said inner shell to said outer shell;

a second elastomeric member axially connecting said inner shell to said outer shell at a first end of said first elastomeric member and having a diameter larger than a diameter of said first elastomeric member:

a diaphragm axially connecting said inner shell to said outer shell at a second opposed end of said first elastomeric member:

a main liquid chamber defined between said first elastomeric member and said second elastomeric member, so that a volume of said main liquid chamber is increased and decreased by movement in an axial direction of said inner shell and said outer shell relative to each other;

a subsidiary liquid chamber defined between said first elastomeric member and said diaphragm; and a first constriction axially defined in said first elastomeric member over an entire length of said first elastomeric member to permit communication between said main liquid chamber and said subsidiary liquid chamber.

2. The liquid-encapsulated anti-vibration device according to claim 1, further comprising a second constriction wherein said first constriction has different resonant characteristics from said second constriction.

\* \* \* \* \*